United States Patent Office 3,579,353
Patented May 18, 1971

3,579,353
FOOD PRODUCTS CONTAINING ALKYL-SUBSTITUTED PYRAZINES
Gunther M. Nakel and Brinton Marlo Dirks, Springfield Township, Hamilton County, Ohio, assignors to The Procter & Gamble Company, Cincinnati, Ohio
No Drawing. Filed Oct. 23, 1967, Ser. No. 677,030
Int. Cl. A23l 1/18, 1/22
U.S. Cl. 99—81
4 Claims

ABSTRACT OF THE DISCLOSURE

Food products are made more flavorful by adding 0.15–10,000 p.p.m. of alkyl-substituted pyrazines, especially those having molecular weight less than 140.

BACKGROUND OF THE INVENTION

This invention relates to food products to which alkyl-substituted pyrazines have been added. More particularly, this invention relates to food products to which have been added as flavor additives from about 0.15 to about 10,000 parts per million of alkyl-substituted pyrazines of the formula

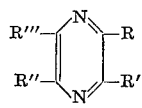

wherein R, R', R", and R''' are selected from the group consisting of hydrogen and alkyl groups containing from 1 to about 4 carbon atoms.

Many species of alkyl-substituted pyrazines having the above formula are known, as are methods of their preparation. In regard to food systems, pyrazine compounds are known to be produced, along with others, in browning (caramelization) reactions in nitrogenous systems. See, for example, Hodge, J. Agr. Food Chem., 1, 928–43, at 937 (1953). They are also known to be formed upon reacting nitrogenous compounds with carbohydrates such as invert sugar, glucose, molasses, sucrose, lactose, cellobiose, starch, and other oligosaccharides and polysaccharides. See, for example, Davison et al., Chem. Ind. (London), 1956, 982–83; Grimmett, Rev. Pure Appl. Chem., 15, 101–08 (1965); Jezo et al., Chem. Zvesti., 17, 126–39, 255–64, 865–83 (1963) and 18, 837–51 (1964), Chem. Abstr., 60, 4139b, 4139c, 61, 2039a (1964) and 63, 665f (1965); and Wiggins et al., Proc. Congr. Intern. Soc. Sugar-Cane Technologists, 9th India, 1956, 2, 525–29, Chem. Abstr., 53, 13634i (1959).

Pyrazine compounds (including some of the alkyl-substituted pyrazines intended for use in the present invention) have also been identified as naturally occurring components of, or materials produced in the processing of products such as coffee, potato chips, cocoa butter, Spanish peanuts, and cacao beans. See, for example, U.S. Patent 1,696,419 (granted to Staudinger et al.); Deck et al., Chem. Ind. (London), 1965, 1343; Dietrich et al., Helv. Chim. Acta, 47, 1581–90 (1964); Gianturco, Nature, 210, 1358 (1966); Mason et al., J. Agr. Food Chem., 14, 454–460 (1966); Rizzi, J. Agr. Food Chem., 15, 549–51 (1967); and Viani et al., Helv. Chim. Acta, 48, 1809–15 (1965). These references, however, do not show the addition of alkyl-substituted pyrazines to food products as "flavor additives." By a "flavor additive" is meant a substance intentionally added to a food product in flavor-improving amounts, over and above any which might be naturally present. Thus, it is known that alkyl-substituted pyrazines are sometimes natural components of foods; but not that when they are added as flavor additives to food products which may or may not contain naturally occurring pyrazines, new and improved results are achieved.

U.S. Patent 3,328,402 (granted to Winter, June 27, 1967) describes methyl-methoxy-pyrazines and methyl-methylmercapto-pyrazines and their use as flavoring agents; however, these compounds all contain either oxygen or sulfur, and hence the reference does not disclose this invention's use of structurally differing compounds, namely, alkyl-substituted pyrazines, as flavor additives. Also, the compounds of U.S. 3,328,402 are said to develop an objectionable off-flavor when used in concentrations greater than 200 mg./100 kg. (i.e., 2 parts per million); the compounds of this invention do not have this disadvantage.

SUMMARY OF THE INVENTION

It has been surprisingly found that alkl-substituted pyrazines of the formula

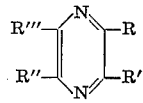

wherein R, R', R", and R''' are selected from the group consisting of hydrogen and alkyl groups containing from 1 to about 4 carbon atoms, are excellent flavor additives when added to food products at concentrations within the range of from about 0.15 to about 10,000 parts per million. Throughout this specification, parts and percentages are by weight unless otherwise indicated. R, R', R" and R''' can be alike or different. Preferably, they are hydrogen or methyl or ethyl groups. At least one must be an alkyl group in order to result in an "alkyl-substituted" pyrazine.

Stated another way, there has been discovered a method of enhancing the flavor of a food product which comprises adding to the food product from about 0.15 parts per million to about 10,000 parts per million of an alkyl-substituted pyrazine of the formula

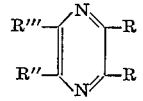

wherein R, R', R", and R''' are selected from the group consisting of hydrogen and alkyl groups containing from 1 to about 4 carbon atoms. Preferably, the alkyl-substituted pyrazine has a molecular weight less than 140, and is added in a concentration ranging from about 10 to about 750 parts per million. Even more preferably, R, R', R" and R''' are hydrogen or ethyl or methyl groups; and the alkyl-substituted pyrazine has a molecular weight less than 140, and is added in a concentration ranging from about 10 to about 750 parts per million.

Food products to which alkyl-substituted pyrazines can be beneficially added, and the flavors of which are thereby enhanced, include, but are not limited to, peanut butter, cooking oil, potato chips, instant coffee, brewed coffee, tea, malted milk, cakes, especially vanilla-flavored and devil's food (chocolate-flavored), cereal flakes such as corn or soy flakes, cocoa, bread shortening, bakery products such as rolls and muffins, and compounded flavors such as chocolate, vanilla, walnut and caramel.

The amount of alkyl-substituted pyrazines to be added depends on the food product to be flavored, the flavor to be produced and the amounts of flavorful substances present from other sources. As low as about 0.15 parts per million have been found to be effective in some cases; on the other hand, about 10,000 parts per million can be added to others. Usually, however, it is desirable to add at least about 10 parts per million to obtain a proper improvement in flavor, and more than about 750 parts per million is not required. Therefore, a preferred range is from about 10 to about 750 parts per million.

The particular alkyl-substituted pyrazines to be added also depends on the food product, flavor desired, and other materials present. A non-exhaustive list of pyrazines which can be added is given following Example 21. Specific examples of flavors produced under various conditions are given in Examples 22-29. In general, it can be said that the lighter alkyl-substituted pyrazines (i.e., having lower molecular weight) are superior to the heavier ones. Thus, a high molecular weight compound such as tetrabutylpyrazine is much less volatile and not as effective as a lighter one such as a dimethylpyrazine. A good line of demarcation is molecular weight 140. Below this, alkyl-substituted pyrazines contain from 5 to 8 carbon atoms (approximate molecular weights of 94 to 136); are volatile and very flavorful, and are hence preferred. Above this, pyrazines are less volatile and less flavorful.

The manner of using the alkyl-substituted pyrazines also varies. Alkyl-substituted pyrazines added by themselves to food products in the specified amounts produce an improved flavor. Sometimes an additional ingredient is used in combination with the alkyl-substituted pyrazines (such as vanillin, see Example 27), and the flavor produced is a synergistic product of the two materials together. Occasionally a preferred flavor can be produced with a large number of ingredients of which alkyl-substituted pyrazines are only a part, although perhaps a major part. Finally, another aspect of the invention lies in the addition of alkyl-substituted pyrazines to food products as flavor "potentiators" wherein they do not actually impart any flavor themselves, but make the mouth more receptive to other flavors present, much in the same manner as monosodium glutamate, 5'-ribonucleotides, etc. In this connection, alkyl-substituted pyrazines have an advantage in that they enhance the natural flavors present in a food product but leave no salty impression or other aftertaste.

In any application, the use of an appropriate concentration of alkyl-substituted pyrazines as flavor additives avoids the bitterness or astringency associated with overcooking or overroasting which might be another way to obtain similar flavors which are achieved by adding alkyl-substituted pyrazine additives.

DETAILED DESCRIPTION (A) Useful alkyl-substituted pyrazines and methods of their preparation, and illustrations of their use as flavor additives Many alkyl-substituted pyrazines are commercially available, as is unsubstituted pyrazine. For example, the following can all be readily obtained commercially: methylpyrazine; 2,5-dimethylpyrazine; 2,6-dimethylpyrazine; and tetramethylpyrazine. Alternatively, alkyl-substituted pyrazines can be synthesized. The following Examples 1-21 are illustrative of methods of their preparation and of food products to which they can be added. Three general reactions are described: diketone plus ethylenediamine; alkyllithium plus dialkylpyrazine; and sodamide plus alkylpyrazine.

(1) DIKETONE PLUS ETHYLENEDIAMINE

Example 1.—2,3-dimethylpyrazine

Ethylenediamine can be condensed with vicinal diketones to yield 2,3-dialkyl-5,6-dihydropyrazines, which can be oxidized to 2,3-dialkylpyrazines. As an example of this type of synthesis, ethylenediamine was condensed with 2,3-butanedione according to the procedure of Ishiguro et al., reported in Yakugaku Zasshi, 78, 229-31 (1958), Chem. Abstr., 52, 1186-62 (1958), to form 2,3-dimethyl-5,6-dihydropyrazine. The compound was obtained as a pale yellow oil, boiling at 46-53° C. at 10-11 mm. Hg, in 67% yield. Literature (Ishiguro, ibid.) indicates a boiling point of 60-63 at 18 mm. Hg.

To 64.0 grams (0.582 moles) of 2,3-dimethyl-5,6-dihydropyrazine in a 3-liter round-bottomed flask were added 1200 milliliters of 33% aqueous potassium hydroxide solution and 320 grams (1.36 moles) of reagent grade mercuric chloride. After heating and stirring for 2½ hours on a steam bath (about 100°C.), the flask was arranged for steam distillation, and 1 liter of aqueous distillate was collected. Continuous ether extraction of this distillate for 16 hours yielded the crude 2,3-dimethylpyrazine. This, in turn, was distilled at atmospheric pressure, boiling at 156-158° C. to give the pure 2,3-dimethylpyrazine in 28% yield. The picrate derivative of this compound was prepared and found to melt at 151°–153° C. The literature values for the boiling point of 2,3-dimethylpyrazine and the melting point of its picrate serve as a basis for identification (156° C and 150° C, respectively, as reported in Beilsteins Handbuch der Organischen Chemie, 23, p. 95). 2,3-dimethylpyrazine prepared in this example is added to shortening used in a breadmaking process to give enhanced flavor to the bread product. The amount added is sufficient to provide 100 parts per million (p.p.m.), by weight of the finished dough, of added 2,3-dimethylpyrazine.

Example 2.—2-ethyl-3-methylpyrazine

If a symmetrical vicinal diketone is used in the above reaction, as in the preceding example, then a 2,3-dialkylpyrazine with identical alkyl groups results. However, the general reaction is not so limited, and if a nonsymmetrical diketone is used, a 2,3-dialkylpyrazine with differing alkyl groups results. For example, condensation of 2,3-pentanedione with ethylenediamine gave 2-ethyl-3-methyl-5,6-dihydropyrazine in 58% yield, boiling at 65.5–68° C. Oxidation with mercuric chloride afforded 2-ethyl-3-methylpyrazine (boiling at 58-63° C at 12 mm. Hg) in 8.1% overall yield. An analytical sample was purified by gas chromatography on a silicone column, and identified by elemental analysis. Popcorn is popped in a normally flavorless oil to which has been added 100 p.p.m. of the 2-ethyl-3-methylpyrazine prepared in this example to give a highly flavorful product.

Example 3.—2,3-diethylpyrazine

In a similar fashion, 3,4-hexanedione was condensed with ethylenediamine to yield 2,3-diethyl-5,6-dihydropyrazine, which was oxidized with mercuric chloride to 2,3-diethylpyrazine, identified by its nuclear magnetic resonance spectrum. Tea to which is added 10 p.p.m. of purified 2,3-diethylpyrazine thus prepared has an enriched flavor.

Examples 4–5.—2-isopropyl-3-methylpyrazine and 2-methyl-3-propylpyrazine 4-methyl-2,3-pentanedione can be prepared according to the process of U.S. Patent 2,393,532 (granted to Hearne et al.), and condensed with ethylenediamine to form 2-isopropyl-3-methyl-5,6-dihydropyrazine, which can in turn be oxidized to 2-isopropyl-3-methylpyrazine. 2,3-hexanedione can be obtained by the process of U.S. Patent 2,398,685 (granted to Yale et al.), condensed with ethylenediamine and oxidized to 2-methyl-3-propylpyrazine. Substantially similar yields are obtained as in the preceding examples.

10 p.p.m. of 2-isopropyl-3-methylpyrazine is added to chocolate fudge candy to improve its flavor. Rolls are made from dough including shortening to which is added 100 p.p.m. (by weight of the entire dough) of 2-methyl-3-propylpyrazine so prepared, and the rolls have an improved, desirable flavor.

(2) ALKYLLITHIUM PLUS DIALKYLPYRAZINE

Example 6.—Trimethylpyrazine

Alkyllithium can be reacted with dialkylpyrazine to form trialkypyrazines in moderate yields. To produce trimethylpyrazine, the procedure of Klein et at. [J. Am. Chem. Soc., 72, 1844 (1950) and 73, 2949–51 (1951)] was employed with slight modification. To a stirred, ice-cold solution of 1.62 molar methyllithium in ethyl ether (125 milliliters), there was added, by drops, a solution of 2,5-dimethylpyrazine (21.6 grams, or 0.20 moles) in 25 milliliters of ethyl ether. A dark red solid formed, which was stirred vigorously for 10 minutes at 0° C., 30 minutes at room temperature, and finally cooled again to 0° C. Water was added to decompose the red "complex" and the pyrazinic reaction products were isolated in 16 hours by continuous liquid-liquid ether extration. Distillation of the crude product gave 13.8 grams of pale orange oil, boiling at 35–93° C. at 34 mm. Hg. This oil was shown by gas chromatography to contain unchanged 2,5-dimethylpyrazine (18% yield), trimethylpyrazine (31% yield), and tetramethylpyrazine (4.5% yield). A portion of trimethylpyrazine was isolated by preparative gas chromatography. The bis-picrate of this compound was prepared and found to melt at 140–142° C. after recrystallization from water (Beilstein, op. cit. at p. 97, gives a melting point of 138–39° C.).

A caramel flavored cake mix to which is added 10 p.p.m of the trimethylpyrazine of this example is baked to produce a cake having an enhanced flavor.

Example 7.—2-ethyl-3,5-dimethylpyrazine

Addition of 2,6-dimethylpyrazine to ethyllithium in an analogous fashion to that described in Example 6 gave a 28% yield of 2-ethyl-3,5-dimethylpyrazine. The volatile product comprised unchanged 2,6-dimethylpyrazine and the desired product; they could not be completely separated by simple distillation. Preparative gas chromatography yielded pure 2-ethyl-3,5-dimethylpyrazine as a colorless oil, identified by elemental analysis. 50 p.p.m. of 2-ethyl-3,5-dimethylpyrazine made in this manner is added to cereal flakes before they are toasted. The toasted flakes have an improved taste.

Example 8.—2-ethyl-3,6-dimethylpyrazine

Addition of one equivalent of 2,5-dimethylpyrazine to an ethereal solution of ethyllithium in a manner similar to that employed for the syntheses of trimethylpyrazine in Example 6 and of 2-ethyl-3,5-dimethylpyrazine in Example 7 produced 2-ethyl-3,6-dimethylpyrazine in 30% yield. As in the preceding Example 7, some unchanged starting material (in this case, 2,5-dimethylpyrazine) could not be readily separated from the desired product by simple distillation. Preparative gas chromatography afforded the pure 2-ethyl-3,6-dimethylpyrazine as a colorless oil, identified by elemental analysis. Potato chips to which have been added 725 p.p.m. of 2-ethyl-3,6-dimethylpyrazine, prepared as above, have an enriched flavor.

Example 9.—2-ethyl-5,6-dimethylpyrazine

If 2,3-dimethylpyrazine is substituted for either the 2,6- or 2,5-dimethylpyrazines of Examples 7 or 8, respectively, 2-ethyl-5,6-dimethylpyrazine is obtained in substantially similar yield. Chocolate chip cookies are prepared containing 10 p.p.m. (by weight of the entire cookie) of the 2-ethyl-5,6-dimethylpyrazine, thus prepared, added to the mix before baking. The baked cookies have an enhanced flavor.

(3) SODAMIDE PLUS ALKYLPYRAZINE

Example 10.—Propylpyrazine

Sodamide ($NaNH_2$) can be reacted with an alkyl-substituted pyrazine to substitute an atom of sodium for an atom of hydrogen on an α-carbon of an existing side chain [see Behun et al., J. Org. Chem., 26, 3379 (1961)]. The sodium-substituted product can be reacted with an alkyl halide to yield a more highly substituted pyrazine than the starting material. Examples 10–21 are illustrative of this general reaction.

A slurry of 1.17 gram (0.030 mole) of sodamide in anhydrous liquid ammonia was stirred while 2.82 grams (0.030 mole) of neat anhydrous methylpyrazine was added in drops. After stirring for about 25 minutes, the deep red 2-pyrazinylmethyl-sodium of the formula

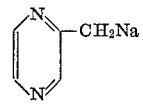

was treated with drops of ethyl iodide (3 milliliters, about 10% excess). Reaction was rapid, and when one equivalent of ethyl iodide had been added (about 1 hour), the initially red mixture became nearly colorless. The ammonia (solvent and by-product from sodamide) was then allowed to boil off. The residue was diluted with water and extracted continuously with ether for 16 hours. 3.22 grams was distilled under reduced pressure to give propylpyrazine in 75% yield. The product boiled at 66–70° C. at 15 mm. Hg, and had a refractive index ($n_D^{25}$) of 1.4909 (Behun et al. report boiling point 172–4° C., $n_D^{25}$ 1.4909). Gas chromatography indicated the distillate contained 92% n-propylpyrazine and nearly 8% unchanged methylpyrazine. Propylpyrazine, prepared as above, is added in 200 p.p.m. quantity to peanut butter. It imparts to the flavor of the peanut butter a fruity "green" flavor, similar to fermented nuts.

Examples 11–12.—Ethylpyrazine and butylpyrazine

Methyl iodide and propyl iodide were substituted for the ethyl iodide of Example 10 to yield ethylpyrazine (78% yield, 91% pure by gas chromatography, boiling point 49–54 at 14 mm. Hg; purified sample, $n_D^{25}$ 1.4953), and butylpyrazine (77% yield, 96% purity, boiling point 84–87° C. at 19 mm. Hg, $n_D^2$ 1.4880), respectively. Gainer reports $n_D^{25}$ 1.4969 for ethylpyrazine [J. Org. Chem., 24, 691 (1959)]; Klein et al. [J. Am. Chem. Soc., 73, 2949–51 (1951)] report a boiling point of 84° C. at 19 mm. Hg, and $n_D^{26}$ 1.4963, for butyl pyrazine. Ethylpyrazine, at a concentration of 50 p.p.m., enhances the flavor of cereal flakes to which it is added before toasting. Butylpyrazine added in 200 p.p.m. quantity to peanut butter gives the latter a camphoraceous flavor, with caraway top note.

Examples 13–14.—2-ethyl-5-methylpyrazine and 2-ethyl-6-methylpyrazine

In a similar manner, portions of 2,5-dimethylpyrazine and 2,6-dimethylpyrazine were reacted with sodamide and methyl iodide to give 2-ethyl-5-methylpyrazine (62% yield, 77% pure by gas chromatography, boiling point 57–68° C. at 10–11 mm. Hg) and 2-ethyl-6-methylpyrazine (85% yield, 90% purity, boiling point 57.5–64.5 at 12 mm. Hg), respectively. The former was identified by elemental analysis; the latter was purified by gas chromatography and identified by nuclear magnetic resonance.

Meat is fried in cooking oil containing 50 p.p.m. added 2-ethyl-5-methylpyrazine of Example 13 and has an enhanced flavor. Potatoes fried in cooking oil containing 25 p.p.m. added 2-ethyl-6-methylpyrazine of Example 14 have an enriched flavor.

Examples 15–16.—2,5-diethylpyrazine and 2,6-diethylpyrazine 2,5-dimethylpyrazine and 2,6-dimethylpyrazine were separately reacted with, in each case, 2 equivalent sodamide and 2 equivalents methyl iodide. In each case a complex mixture of alkylated products was obtained from which small amounts of 2,5-diethylpyrazine and 2,6-diethylpyrazine were isolated, respectively, by gas chromatography. The homogeneity and proof of structure of 2,5-diethylpyrazine were established by nuclear magnetic resonance and gas chromatography data; nuclear magnetic resonance data on the purified 2,6-diethylpyrazine was consistent with the proposed structure.

25 p.p.m. of 2,5-diethylpyrazine is added to cooking oil which is included in a pie crust dough. The dough, when baked, has an improved flavor. Ice cream is made containing vanilla flavoring to which has been added 25 p.p.m., by weight of the entire formulation, of 2,6-diethylpyrazine. The flavor of the ice cream is ameliorated.

Examples 17–18.—Isopropylpyrazine and tert-butylpyrazine

Three portions of methylpyrazine were methylated with varying amounts of sodamide (1, 2 and 4 moles sodamide per mole of methylpyrazine) and methyl iodide (1 mole methyl iodide per mole of sodamide) to yield the following mixtures of methyl-, ethyl-, isopropyl-, and tert-butylpyrazine:

| Moles of sodamide per mole of methylpyrazine | Percent yield of alkylpyrazines | | | |
|---|---|---|---|---|
| | Methyl— | Ethyl— | Iso-propyl— | Tert-butyl |
| 1 | 4.9 | 77.6 | 2.56 | Trace. |
| 2 | 3.6 | 31.8 | 42.0 | 4.33 |
| 3 | 0.47 | 24.0 | 9.9 | 24.6 |

From these mixtures, isopropyl- and tert-butylpyrazines were isolated by gas chromatography. They were identified by elemental analysis and nuclear magnetic resonance.

Saltine crackers are made containing 100 p.p.m. added isopropylpyrazine, and exhibit an enhanced flavor. Margarine is made more flavorful by the addition of 25 p.p.m. of tert-butylpyrazine.

Examples 19–21.—2-methyl-5-propylpyrazine, 2-methyl 6-propylpyrazine, and isobutylpyrazine If ethyl iodide is substituted for the methyl iodide of Examples 13 and 14, then 2-methyl-5-propylpyrazine is obtained from 2,5-dimethylpyrazine, and 2-methyl-6-propylpyrazine is obtained from 2,6-dimethylpyrazine, in substantially similar yields and purities. Cocoa to which is added 25 p.p.m. 2-methyl-5-propylpyrazine is highly flavorful. The flavor of chocolate flavored cake frosting is enhanced by the addition of 10 p.p.m. of 2-methyl-6-propylpyrazine.

If isopropyl iodide is substituted for the ethyl iodide, methyl iodide, or propyl iodide of Examples 10, 11, and 12, respectively, isobutylpyrazine is obtained from 2-methylpyrazine in substantially similar yield and purity. Muffins are made with shortening containing 75 p.p.m. isobutylpyrazine and have an improved flavor.

The above examples are merely illustrative of methods of preparing and using the alkyl-substituted pyrazines of this invention. Other methods of preparing alkyl-substituted pyrazines are known or can be devised by those skilled in the art. The methods of synthesis are not themselves part of the invention, but are included to provide a description of the manner and process of making the compounds and using the invention.

In naming the alkyl-substituted pyrazines described above, the alphabetic convention has been followed—i.e., substituents are listed in the order butyl, ethyl, isobutyl, isopropyl, methyl, and propyl, with the first listed substituent receiving the lower number. Since pyrazines have been, on occasion, named in other ways (for example, by listing substituents in increasing molecular weight), and to avoid any confusion as to what compounds are indicated, the following structural formulas are included.

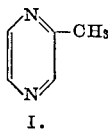
I.

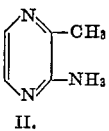
II.

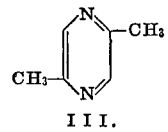
III.

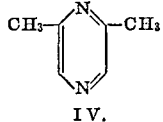
IV.

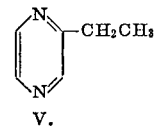
V.

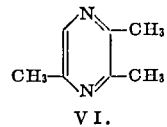
VI.

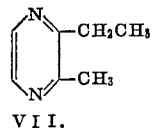
VII.

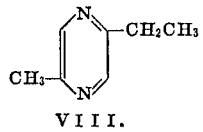
VIII.

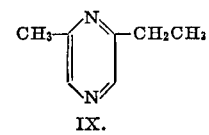
IX.

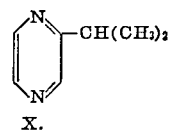
X.

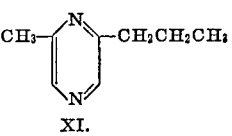
XI.

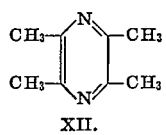
XII.

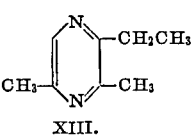
XIII.

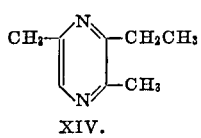
XIV.

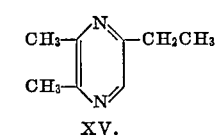
XV.

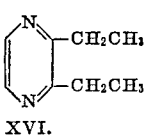
XVI.

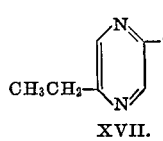
XVII.

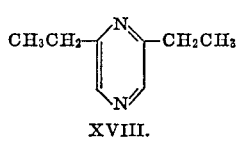
XVIII.

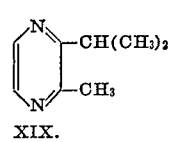
XIX.

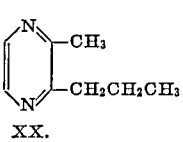
XX.

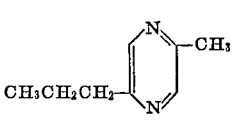
XXI.

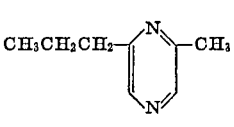
XXII.

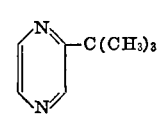
XXIII.

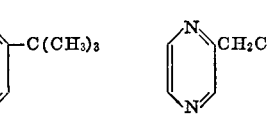
XXIV.

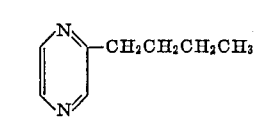
XXV.

The names assigned to these structures, and the examples in which their syntheses are illustrated, if any, are indicated in the following table.

| | Name | Example |
|---|---|---|
| Formula: | | |
| I | Methylpyrazine | (1) |
| II | 2,3-dimethylpyrazine | 1 |
| III | 2,5-dimethylpyrazine | (1) |
| IV | 2,6-dimethylpyrazine | (1) |
| V | Ethylpyrazine | 11 |
| VI | Trimethylpyrazine | 6 |
| VII | 2-ethyl-3-methylpyrazine | 2 |
| VIII | 2-ethyl-5-methylpyrazine | 13 |
| IX | 2-ethyl-6-methylpyrazine | 14 |
| X | Isopropylpyrazine | 17 |
| XI | Propylpyrazine | 10 |
| XII | Tetramethylpyrazine | (1) |
| XIII | 2-ethyl-3,5-dimethylpyrazine | 7 |
| XIV | 2-ethyl-3,6-dimethylpyrazine | 8 |
| XV | 2-ethyl-5,6-dimethylpyrazine | 9 |
| XVI | 2,3-diethylpyrazine | 3 |
| XVII | 2,5-diethylpyrazine | 15 |
| XVIII | 2,6-diethylpyrazine | 16 |
| XIX | 2-isopropyl-3-methylpyrazine | 4 |
| XX | 2-methyl-3-propylpyrazine | 5 |
| XXI | 2-methyl-5-propylpyrazine | 19 |
| XXII | 2-methyl-6-propylpyrazine | 20 |
| XXIII | tert-Butylpyrazine | 18 |
| XXIV | Isobutylpyrazine | 21 |
| XXV | Butylpyrazine | 12 |

[1] No synthesis is illustrated for these compounds, as they are readily commercially available.

Further details concerning the synthesis of some of the above compounds are given by Rizzi, in J. Agr. Food Chem., 15, 549–51 (1967).

(B) Adding alkyl-substituted pyrazines to food products to improve flavor

Alkyl-substituted pyrazines can be included in a wide variety of food products. The flavor they impart varies substantially with the food product and alkyl-substituted pyrazine used. The following examples are illustrative (all proportions are by weight unless otherwise indicated):

Example 22.—Peanut butter

Five portions of a commercially available peanut butter (sold under the name "Jif") were each mixed with about 200 p.p.m. of one of five alkyl-substituted pyrazines, until homogeneous mixtures were obtained. The flavor of each portion to which had been added an alkyl-substituted pyrazine was compared with a similar portion of peanut butter with no added pyrazine. In making this comparison, particular attention was given to the enhancement of the natural roast and peanut flavor characteristics.

The following results were obtained:

| Additive | Flavor observed |
|---|---|
| 2,5-dimethylpyrazine | Nutty, roasted character; moderate enhancement of roast characteristic without bitterness or astringency. |
| Methylpyrazine | Slight musty nutty note, with faint phenolic top note; similar to 2,5-dimethylpyrazine, but not as full or rounded. |
| 2-ethyl-3-methyl-pyrazine | Slightly camphoraceous, with an amine background; raw, slightly green nutty note, slight fermented vegetation. |
| Propylpyrazine | Slight fruity "green" flavor, similar to fermented nuts. |
| Butylpyrazine | Slightly camphoraceous, with a caraway top note. |

Of these five flavors, all were desirable in enhancing the natural roast and peanut flavor of peanut butter and the most preferred were 2,5-dimethylpyrazine and methylpyrazine. These two compounds were each mixed with portions of the same commercial peanut butter, each in three varying amounts, and the flavor was compared with that of the unflavored peanut butter, with the following results:

| Additive | Amount, p.p.m. | Flavor observed |
|---|---|---|
| 2,5-dimethyl-pyrazine | 50 | Slightly low, but mild roasted note. |
| Do | 100 | Roasted flavor, without bitterness. |
| Do | 200 | Nutty, roasted charter; moderate enhancement of roast characteristic without bitterness or astringency. |
| Methyl-pyrazine | 50 | Enhances roasted note; not as strong as 2,5-dimethylpyrazine. |
| Do | 100 | Good roasted note with no bitterness. |
| Do | 200 | Slight musty nutty note, with faint phenolic top note; similar to 2,5-dimethylpyrazine, but not as full or rounded. |

In the case of both 2,5-dimethylpyrazine and methylpyrazine, the 100 p.p.m. level was most satisfactory and is thus highly preferred. It was also observed that both additives gave similar flavors, but that the 2,5-dimethylpyrazine had a stronger nutty flavor, along with the roasted notes.

The above example represents a preferred embodiment of the invention, i.e., peanut butter to which has been added, as a flavor additive to enhance the natural roast and peanut flavor, from about 50 to about 200 p.p.m. of an alkyl-substituted pyrazine selected from the group consisting of 2,5-dimethylpyrazine; methylpyrazine; 2-ethyl-3-methylpyrazine; propylpyrazine; butylpyrazine; and mixtures thereof. The example also represent a highly preferred embodiment of the invention, i.e., peanut butter to which has been added as a flavor additive about 100 p.p.m. of 2,5-dimethylpyrazine or methylpyrazine.

Example 23.—Cooking oil

Alkyl-substituted pyrazines, when added to a cooking or frying oil, have been found to give a definite and desirable flavor to the products cooked in them. Six portions of a commercially available cooking oil (sold under the name "Crisco Oil") were blended with each of three different alkyl-substituted pyrazines (methylpyrazine; 2,5-dimethylpyrazine; and 2-ethyl-3-methylpyrazine), in amounts of 10 p.p.m. and 50 p.p.m. Chicken legs were cooked in each of these six oils containing alkyl-substituted pyrazines, and also in a seventh portion of oil containing no additive. The chicken legs fried in the six oils to which an alkyl-substituted pyrazine had been added as a flavor additive tasted better than those cooked in the oil with no additive; this difference was characterized as containing a "fried–meaty" note. Little difference was observed among the chicken legs cooked in oils containing the various alkyl-substituted pyrazines; however, a slight preference for those cooked in the oil containing 2,5-dimethylpyrazine was observed, as compared to those cooked in the other oils containing additives.

In addition to the improved flavor of the food cooked in the oils, it was also noted that the aromas produced when cooking occurred were improved. At 10 p.p.m., only the fact that the aromas were more pleasant than the control could be discerned; however, at 50 p.p.m., the aromas were characterized as slightly sharp and cracker-like, but moderate.

This example thus represents another preferred embodiment of the invention, i.e., cooking oil to which has been added, as a flavor additive to impart a fried meaty note to foods cooked therewith, from about 10 to about 50 p.p.m. of an alkyl-substituted pyrazine selected from the group consisting of methylpyrazine; 2,5-dimethylpyrazine; 2-ethyl-3-methylpyrazine, and mixtures thereof.

Example 24.—Potato-flavored doughs

Pyrazines can be added to components of known food products; and when so added, alter the taste of the resulting food product in a desirable way. Thus, a dough made from flour, salt, cooking oil and water can be made to taste like potato chips by the inclusion of appropriate flavor components, including alkyl-substituted pyrazines. Four flavoring mixtures were compounds for this purpose, having the following compositions:

| | Flavoring mixture | | | |
|---|---|---|---|---|
| Compound | a | b | c | d |
| 2-furfural, $C_4H_3OCHO$, milliliter | 0.15 | 0.30 | 0.20 | None |
| 2,5-dimethylpyrazine, milliliter | 0.10 | 0.20 | 0.25 | 0.50 |
| 2-ethyl-3-methylpyrazine, milliliter | 0.25 | 0.50 | 0.60 | 0.50 |
| 2% "Palatone" in ethyl alcohol, milliliter | 0.50 | 1.00 | 0.75 | 0.75 |
| Methionine, $CH_3SCH_2CH_2CHNH_2CO_2H$, gram | 0.10 | 0.20 | 0.20 | 0.30 |

"Platatone" is a trademarke for maltol (3-hydroxy-2-methyl-4-pyrone), a synthetic aromatic chemical used in flavor compounding.

To each of the above four flavoring mixtures was added three milliliters of a commercially available cooking oil (sold under the name "Crisco Oil"), having a density of about 0.92 grams per milliliter. The four flavoring mixtures were then each mixed with the cooking oil until homogeneous to give four compounded "flavor concentrates."

One milliliter of each flavor concentrate was then mixed with one of four 100-milliliter portions of the same type of cooking oil mentioned above, and each flavored oil was mixed until homogeneous. The four oils containing flavoring mixtures a, b, c, and d contained totals of about 900, about 1450, about 1800, and about 2100 parts per million, respectively, of the two designated alkyl-substituted pyrazine flavor additives.

A small portion of the flavored oils containing flavoring mixtures a, b, and c, and also a small portion of unflavored oil as a control, were separately heated in an electric skillet at 350° F. The aromas of each heated oil were observed. The oil containing flavoring mixture b gave a mild, potato, fried aroma; and the oil containing flavoring mixture c gave a pleasant strong, potato, fried aroma. Each aroma is indicated in comparison with that of the oil containing no additive.

Five doughs were prepared from the following:

| | Parts by weight |
|---|---|
| Flour | 110 |
| Salt | 2.5 |
| Oil | 55 |
| Water | 30 |
| Total | 197.5 |

Four of the doughs contained flavored oils, prepared as above; the fifth was a control containing unflavored oil. The four doughs containing flavored oils contained totals of about 250, about 400, about 500, and about 600 parts per million of the two designated alkyl-substituted pyrazines, respectively.

The five doughs were then baked for 10 minutes in a preheated 400° F. oven. The flavors of the four flavored baked doughs, as compared to the baked dough made with unflavored oil, were as follows:

Flavoring mixture
in oil: Flavor of baked dough:
  a _____. mild, roasted fat taste.
  b _____ moderate, potato-like flavor.
  c _____. highly desirable potato-chip note.
  d _____ similar to c except sharper in flavor.

Example 25.—Potato chips

Ten milliliters of a commercially available cooking oil (sold under the name "Crisco Oil"), 1.0 gram of methionine, 1.4 grams of proline, and 7.2 grams of fructose were mixed in a mortar. Dry ingredients were ground together first, and oil was added after dry mixing. The mixture was then heated in a beaker for 15 minutes at 150° C. The sticky syrup which resulted (about 5 to 10 milliliters) was diluted with 150 milliliters of water to produce a basic flavoring solution. This solution is believed to have contained some pyrazine compounds (reaction products of fructose with the two amino acids), but it contained none as a specific flavor additive.

Portions of the basic flavoring solution made as described above were incorporated in two batches of dough. The first batch contained 180 grams potato flakes, 120 grams potato flour, 21.25 grams basic flavoring solution, and 148.75 grams water. The dough was made by mixing the potato flakes and potato flour together, adding one part of basic flavoring solution to seven parts water, boiling these liquid ingredients together, and adding 170 grams of the liquid to the dry ingredients.

The second batch of dough was made in the same way as the first, except that in addition, 0.34 gram of 2-ethyl-3,6-dimethyl-pyrazine was included in the liquid ingredients added to the dry ingredients. This was equivalent to 0.2% of the liquid, or about 725 parts per million of the dough.

The stiff dough from each bath was milled to a thickness of about 0.01 inch, and punched into potato-chip-shaped disks, which were fried at 350° F. for 15 seconds. The products made from the first batch of dough had a distinct browned fatty note, with a "potato-chip-like" top note. Those made from the second batch, however, were superior in taste to those of the first batch, having in addition a distinct "earthy" top note and a more intense overall flavor.

The above two Examples 24 and 25 represent yet another preferred embodiment of the invention, namely, a potato-flavored composition to which has been added, as a flavor additive to enhance the potato chip flavor, from about 250 to about 725 parts per million of an alkyl-substituted pyrazine selected from the group consiting of 2,5-dimethylpyrazine; 2-ethyl-3-methylpyrazine; 2-ethyl-3,6-dimethylpyrazine, and mixtures thereof.

Example 26.—Instant coffee

Eight portions of liquid coffee product were prepared, each containing one teaspoon (about 1.2 grams) of a commercially available instant coffee powder (Folger's Instant) and about 240 grams hot water.

Four portions of the coffee contained, in addition to the instant coffee powder and hot water, 50 parts per million of an alkyl-substituted pyrazine. Three portions contained a mixture of 25 parts per million of each two alkyl-substituted pyrazines. The final portion contained no added pyazines, and was a control.

The flavor and aroma of each portion of the coffee containing an additive was judged to be superior to the portion containing no additive. The improvements were characterized as follows:

| Additive(s) | Flavor and aroma improvement |
|---|---|
| 50 p.p.m. 2,3-dimethyl-pyrazine. | Sharp aroma, like that of higher aromatic portion of roasted meat; slightly sweet. |
| 50 p.p.m. 2-ethy-3-methyl-pyrazine. | Deep, heavy, almost "burnt" character. |
| 50 p.p.m. 2,5-dimethyl-pyrazine. | Heavy roasted character; lacks "burnt" portion of aroma. |
| 50 p.p.m. methylpyrazine | Mild fruity ethereal note. |
| 25 p.p.m. 2,3-dimethyl-pyrazine plus 25 p.p.m. 2-ethyl-3-methylpyrazine. | Heavy, slightly sharp. |
| 25 p.p.m. 2,3-dimethyl-pyrazine plus 25 p.p.m. 2,5-dimethylpyrazine. | Best deep roasted flavor and aroma; no notes foreign to coffee flavor. |

It is to be understood that a "burnt" flavor or aroma, as used in these examples, is considered desirable in a proper amount and in a food product in which the flavor is natural (for example, coffee or crisp bacon).

It is convenient to prepare coffee by including the alkyl-substituted pyrazines in the instant coffee powder, and this method of inclusion is preferred. It is not necessary, however, since the alkyl-substituted pyrazines can be added directly to the liquid coffee product. In order to provide a cup of coffee with about 50 p.p.m. of alkyl-substituted pyrazines, there should be about 10,000 p.p.m. of alkyl-substituted pyrazines in the instant coffee powder, for a typical instant coffee powder intended to be dissolved in about 200 parts by weight of water per part of instant coffee powder.

This example thus represents still another preferred embodiment of the invention, namely, an instant coffee powder to which has been added, as a flavor additive to improve the coffee-like flavor and/or aroma of the liquid coffee product made therefrom, sufficient alkyl-substituted pyrazines to provide about 50 parts per million of alkyl-substituted pyrazines in the liquid coffee product; the alkyl-substituted pyrazines being selected from the group consisting of 2,3-dimethylpyrazine; 2-ethyl-3-methylpyrazine; 2,5-dimethylpyrazine; methylpyrazine; and mixtures thereof.

Example 27.—Cake

(a) Vanilla-flavored cake

Theree compounded vanilla flavors were prepared, each containing the following:

| | Parts by weight |
|---|---|
| Sucrose | 80.00 |
| Vanillin | 16.66 |
| Propylene glycol | 2.48 |
| St. John's Bread Extract | 0.40 |
| 6-methylcoumarin, 8% in 3:1 Ethanol-water solution | 0.16 |
| Benzodihydropyrone | 0.14 |
| Anisic aldehyde | 0.08 |
| Total | 99.92 |

The first compounded flavor contained, in addition, 0.08 parts tetramethylpyrazine; the second contained a like amount of 2,6-dimethylpyrazine. The third compounded flavor contained no alkyl-substituted pyrazine additive. "St. John's Bread Extract" is a flavor material commercially available from several sources, and is a resinous extract of the carob bean.

Each of the three compounded flavors was incorporated into an otherwise unflavored cake mix having the following composition:

| | Parts by weight |
|---|---|
| Sugar | 40.00 |
| Wheat flour | 39.74 |
| Shortening | 11.00 |
| Dextrose and milk solids | 8.04 |
| Salt | 0.75 |
| Leavening (soda and leavening acids) | 1.34 |
| Total | 99.87 |

Each of the three flavor concentrates (containing tetramethylpyrazine; 2,6-dimethylpyrazine; and no added pyrazines) was added to the above cake mix at each of two concentrations (1.0% and 1.85% of the mix), for a total of six cake batters. These six batters were then baked for 35 minutes at 350° F. in a preheated oven to produce six cakes. The finished products containing alkyl-substituted pyrazines contained them in concentrations of about 8 p.p.m. and about 15 p.p.m.; and vanillin in concentrations of about 0.1666% and about 0.308%, respectively.

The flavor contributions of the two alkyl-substituted pyrazines were observed by comparing the cakes containing alkyl-substituted pyrazines to the similar cakes made with flavor concentrates having no alkyl-substituted pyrazines. In each case, the cake containing the higher concentration of alkyl-substituted pyrazines was judged to be superior to that containing the lesser concentration, which in turn was better than the cakes having no alkyl-substituted pyrazines. The specific contributions were similar for both concentrations of each compound, except for intensity, and were observed to be as follows:

Additive:      Flavor contribution
Tetramethylpyrazine —— Pleasant, slightly fuller vanilla background, with slight aromatic top note.
2,6 - dimethylpyrazine —— Pleasant, richer vanilla with a mild, winey top note, similar to that found in vanilla extract.

It appeared that the flavor contribution in these cases was a synergistic effect of both the alkyl-substituted pyrazines and the vanillin, not merely the vanillin or alkyl-substituted pyrazines alone.

(b) Devil's food (chocolate-flavored) cake

A devil's food cake mix, similar to the cake mix of the vanilla cake but containing 6.0% cocoa, was made into six cakes, containing 0.5%, 1.0%, and 1.85%, respectively, of the second and third compounded flavors described above (containing 2,6-dimethylpyrazine and no alkyl-substituted pyrazines). The first three cakes (containing about 4, about 8, and about 15 p.p.m., respectively, of 2,6-dimethylpyrazine; and about 0.0833, about 0.1666%, and about 0.308%, respectively, of vanillin) exhibited an enhancement of the chocolate flavor of the cake, as compared with the cakes containing no alkyl-substituted pyrazine additive.

This example illustrates still another preferred embodiment of the invention, namely, a combination of ingredients adapted for preparing a vanilla-flavored or chocolate-flavored cake (i.e., a cake mix) to which has been added, as a flavor additive to enhance the vanilla or chocolate flavor, respectively, (1) sufficient alkyl-substituted pyrazines to provide from about 4 to about 15 parts per million of alkyl-substituted pyrazines in the prepared cake, the alkyl-substituted pyrazines being selected from the group consisting of tetramethylpyrazine; 2,6-dimethylpyrazine; and mixtures thereof; and (2) sufficient vanillin to provide from about 0.0833% to about 0.308% of vanillin in the prepared cake.

Example 28.—Vanillin-like flavor

Two hundred grams of wheat flour were mixed with 1,000 milliliters of water. 250 milliliters of this mixture was diluted with an additional 1,000 milliliters of water, and then boiled while stirring. To 25 milliliters of the resulting product ("white sauce"), 0.5 milliliter of a 0.1% solution of 2,3-dimethylpyrazine in water was added. The resulting mixture contained about 20 p.p.m. of 2,3-dimethylpyrazine; its aroma was characterized by two of three observers as sweet and vanilla-like.

Example 29.—Cornflakes and similar cereal flakes

A flavor concentrate was prepared from the following:

| | Percent by weight |
|---|---|
| 2-furfural | 24.00 |
| 5-methyl-2-furfural, 10% ethanol solution | 4.80 |
| Tincture castoreum * | 0.25 |
| 2-furfuryl mercaptan, 0.01% ethanol solution | 0.09 |
| 2,3-butanedione | 1.45 |
| Oil of hops | 0.97 |
| Vanillin | 2.40 |
| Ketonarome ** | 2.60 |
| "Palatone" (See Example 24) | 4.80 |
| 2-furyl ethyl ketone, 10% propylene glycol solution | 2.89 |
| 2-acetylfuran, 10% propylene glycol solution | 2.89 |
| 5-methyl-2-acetylfuran, 10% propylene glycol solution | 2.89 |
| Ethylpyrazine | 4.80 |
| Methylpyrazine | 9.60 |
| 2,5-dimethylpyrazine | 4.80 |
| 2,6-dimethylpyrazine | 4.80 |
| Valeric acid | 0.97 |
| Propylene glycol | 24.00 |
| | 100.00 |

\*An ethanol solution of castoreum, a flavoring material extracted from beaver glands (one pound glands per gallon of alcohol).
\*\*2-hydroxy-3-methyl-2-cyclopenten-1-one, existing in equilibrium with 3-methylcyclohexane-1,2-dione:

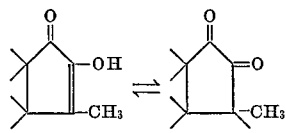

Another alkyl-substituted pyrazine which is highly effective in formulations of this type is 2,3-dimethylpyrazine. It can be substituted for the dimethylpyrazine listed above, with equal or better results.

The flavor of the above formulation was cereal-like in character. The vanillin-ketonarome combination provides the body and main overall flavor, and has a vanilla-caramel character. The combination is broadened and softened by the "Palatone," which has a sugar-candy connotation. The very small quantity of 2-furfuryl mercaptan (0.09 parts per million in this flavor concentrate; less than one part per billion in product) adds depth and body, and the 2,3-butanedione gives a buttery top note as well as contributing to the body of the overall flavor. The acetylfurans and 2-furyl ethyl ketone are modifiers, serving to fill in and smooth out an otherwise harsh blend. Valeric acid gives "lift" to the formulation and enhances the top notes.

The pyrazines play a significant role in this formulation, however, backed up by the base notes of the furfurals. The pyrazines provide a cereal-cracker flavor that is very distinctive, and adds to the fullness of the flavor.

The overall flavor of the above formulation was cereal-like in character, and it had a top note not unrelated to corn.

This flavor concentrate or similar ones containing alkyl-substituted pyrazines can be used in a variety of formulas suitable for preparing cereal flakes to impart a corn-like flavor to an otherwise blend product. It can also serve to mask undesired flavors (such as the strong earthy, beany note imparted by soy flour) which may be present. A typical cereal flake formulation is as follows:

| | Parts by weight |
|---|---|
| Flour | 200 |
| Sucrose | 16 |
| Dextrose | 8 |
| Salt | 4 |
| Water | 40 |
| Flavor concentrate | 0.2–0.7 |
| Total | 268.2–0.7 |

The flour can be soy flour, wheat flour, tapioca flour, or other. If tapioca flour is used, however, an additional amount of water should be used because of the tendency for tapioca to absorb water. About 30 parts of additional water should be used for each 100 parts of tapioca flour. Mixtures of various flours can be used. A portion of corn flour can be included to enhance the corn flavor of the product, but it is not required.

The amount of flavor concentrate listed in the above formula corresponds to about 0.1% to about 0.3% by weight of the dry ingredients, or about 0.06% to about 0.26% of the entire dough, taking into account the varying amount of water to be used. This results in an alkyl-substituted pyrazine content of about 150 p.p.m. to about 650 p.p.m. by weight of the finished cereal product. This is a preferred range for use in a cereal-type product. More broadly, the amount of alkyl-substituted pyrazines used in cereal flakes resembling cornflakes can range up to 5,000 p.p.m. or more; but on the other hand, the presence at concentrations as low as 0.15 p.p.m. of alkyl-substituted pyrazines in the finished product have been found to be beneficial in improving the taste of cereal flakes.

This example illustrates a still further preferred embodiment of the invention, i.e., a cereal flake to which has been added, as a flavor additive to enhance the cereal-cracker flavor and "corny" note of the flakes and to improve the fullness of their flavor, from about 150 to about 650 parts per million of an alkyl-substituted pyrazine selected from the group consisting of ethylpyrazine; methylpyrazine; 2,3-dimethylpyrazine; 2,5-dimethylpyrazine; 2,6-dimethylpyrazine; and mixtures thereof.

What is claimed is:

1. A food product to which has been added from about 10 to about 750 parts per million of an alkyl substituted pyrazine having a molecular weight of less than 140 of the formula

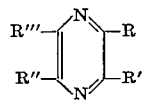

wherein R, R', R" and R''' are selected from the group consisting essentially of hydrogen and alkyl groups containing from 1 to about 4 carbon atoms.

2. The food product of claim 1 wherein the food product is a cooking oil; the alkyl substituted pyrazine is selected from the group consisting of methyl pyrazine, 2,5-dimethyl pyrazine, 2-ethyl-3-methyl pyrazine and mixtures thereof, and the amount of said pyrazine is from about 10 to about 50 parts per million.

3. The food product of claim 1 wherein the food product is a cereal flake; the alkyl substituted pyrazine is selected from the group consisting of ethyl pyrazine, methyl pyrazine, 2,3-dimethyl pyrazine, 2,5-dimethyl pyrazine, 2,6-dimethyl pyrazine and mixtures thereof, and the amount of said pyrazine is from about 150 to about 650 parts per million.

4. A food product which consists of a combination of ingredients adapted for preparing a vanilla flavored or chocolate flavored cake to which has been added as a flavor additive:
 (1) sufficient alkyl-substituted pyrazine to provide from about 4 to about 15 parts per million of alkyl-substituted pyrazine in the prepared cake, the alkyl-substituted pyrazines being selected from the group consisting of tetramethylpyrazine; 2,6-dimethylpyrazine; and mixtures thereof; and
 (2) suffcent vanilla to provide from about 0.0833% to about 0.308% of vanillin in the prepared cake.

References Cited

UNITED STATES PATENTS

| 3,459,556 | 8/1969 | Moroe et al. | 99—23 |
| 1,696,419 | 12/1928 | Staudinger | 99—65 |

OTHER REFERENCES

Mason et al.: "Flavor Components of Roasted Peanuts. Some Low Molecular Weight Pyrazines and a Pyrrole," J. Agr. Food Chem., vol. 14, No. 5, 1966, pp. 454–460.

RAYMOND N. JONES, Primary Examiner

U.S. Cl. X.R.

99—1, 23, 26, 54, 65, 71, 76, 94, 100, 118, 128, 140

PO-1050
(5/69)

UNITED STATES PATENT OFFICE
CERTIFICATE OF CORRECTION

Patent No. 3,579,353      Dated May 18, 1971

Inventor(s) Gunther M. Nakel and Brinton Marlo Dirks

It is certified that error appears in the above-identified patent and that said Letters Patent are hereby corrected as shown below:

Column 2, line 42, the second "R" should read --R'--.
Column 3, line 73, "1186-62" should read --11861-62--.
Column 5, line 3, "dialkylpyrazine" should read --dialkylpyrazines--.
Column 6, line 41, "$n_D^2$" should read --$n_D^{23}$--.
Column 6, line 71, "equivalent" should read --equivalents--.
Column 8, line 25, in the left-hand side of the formula, "$CH_3$" should be deleted.
Column 9, line 69, "charter" should read --character--.
Column 10, line 62, "compounds" should read --compounded--.
Column 10, line 73, "Platatone" should read --Palatone--.
Column 12, line 4, "bath" should read --batch--.
Column 12, line 32, "pyazines" should read --pyrazines--.
Column 12, line 42, "2-ethy-3-methyl-" should read --2-ethyl-3-methyl- --.
Column 14, line 5, "0.0833," should read --0.0833%,--.
Column 14, line 23, "Vanillin" should read --Vanilla--.
Column 14, line 45, "2.60" should read --3.60--.
Column 14, line 72, "dimethylpyrazine" should read --dimethylpyrazine
Column 15, line 23, "blend" should read --bland--.

Signed and sealed this 8th day of February 1972.

(SEAL)
Attest:

EDWARD M. FLETCHER, JR.
Attesting Officer

ROBERT GOTTSCHALK
Commissioner of Patents